United States Patent
Huang et al.

(10) Patent No.: US 7,390,115 B1
(45) Date of Patent: Jun. 24, 2008

(54) LED BLINKER LOAD ASSEMBLY

(76) Inventors: Zhen Qiu Huang, 768 S. Turnbull Canyon Rd., City of Industry, CA (US) 91745; Guan Xiong Huang, 768 S. Turnbull Canyon Rd., City of Industry, CA (US) 91745

( * ) Notice: Subject to any disclaimer, the term of this patent is extended or adjusted under 35 U.S.C. 154(b) by 87 days.

(21) Appl. No.: 11/589,500

(22) Filed: Oct. 31, 2006

(51) Int. Cl.
*B60Q 1/26* (2006.01)

(52) U.S. Cl. .................. 362/542; 362/545; 315/185 R; 315/200 R; 340/815.45

(58) Field of Classification Search .................. 362/540, 362/542, 545; 315/185 R, 186, 200 A; 340/815.45
See application file for complete search history.

(56) References Cited

U.S. PATENT DOCUMENTS

| | | | | |
|---|---|---|---|---|
| 1,885,714 A | * | 11/1932 | Hampton | 315/225 |
| 2,590,513 A | * | 3/1952 | Pattat et al. | 362/20 |
| 5,850,126 A | * | 12/1998 | Kanbar | 315/200 A |
| 6,371,636 B1 | * | 4/2002 | Wesson | 362/545 |
| 6,462,669 B1 | * | 10/2002 | Pederson | 340/815.45 |
| 7,153,008 B2 | * | 12/2006 | Grote et al. | 362/487 |
| 7,345,433 B2 | * | 3/2008 | Bacon et al. | 315/291 |

* cited by examiner

*Primary Examiner*—Ali Alavi
(74) *Attorney, Agent, or Firm*—Albert O. Cota

(57) ABSTRACT

An LED blinker load assembly (LBLA) (10) that can be integrated into the envelope of an LED light bulb or be attached externally to a rear, front or side LED lamp assembly. The LBLA (10) is comprised of an input circuit (12) and an output circuit (14). The two circuits in combination produce a sufficient current flow to operate an LED load circuit (18) and to cause a conventional vehicle flasher unit (60) to be operated normally.

18 Claims, 5 Drawing Sheets

LED BLINKER LOAD ASSEMBLY

TECHNICAL FIELD

The invention generally pertains to the field of vehicle left and right turn signals, brake lights and emergency flashing lights, and more particularly to a Light Emitting Diode (LED) blinker load assembly that allows incandescent light bulbs to be directly replaced by LED light bulbs.

BACKGROUND ART

The use of high-intensity LEDs in vehicles is common because they are reliable, cost-effective and they produce a greater light output using less power than conventional single or dual-filament incandescent light bulbs. Additionally, LEDs require less space and have a longer useful life when compared to incandescent light bulbs.

Prior art has attempted to use LEDs that operate in combination with a vehicle flasher unit to cause a vehicle light to blink ON and OFF whenever a vehicle's right or left turn arm is activated or the emergency flasher button is depressed. A vehicle flasher unit operates with a pair of contacts similar to a conventional relay, with a single exception: one of the relay support arms is made of a bimetallic material similar to the contacts in a home thermostat. The two metals that comprise the bimetallic material have different temperature coefficient characteristics. Thus, when the contacts are heated or cooled they expand or contract at different rates, thereby causing the lights to repeatedly turn "on" and "off", hence the term "blinkers".

A vehicle flasher unit becomes operational when the current applied to the light bulbs also flows through a heater coil that is mounted adjacent the contacts in the flasher unit. When the turn signal and the emergency lights are turned ON, the heater coil heats the contacts, thereby causing one of the metal contacts to heat, which in turn causes it to bend. This action alternately OPENS or CLOSES the contacts of the flasher unit. Once the contacts OPEN, current stops flowing, thereby causing the lights to turn Off. The bimetallic metal cools and it bends back to its original shape, which closes the contacts in the flasher unit and the cycle repeats. This action causes the turn signal lights and the emergency lights to blink ON and OFF.

A search of the prior art did not disclose any literature or patents that read directly on the claims of the instant invention.

DISCLOSURE OF THE INVENTION

The LED blinker load assembly (LBLA) is comprised of an input circuit, an output circuit and an LED load circuit. The LBLA is designed to be integrally located within the envelope of a light bulb or to be attached to the input power leads of an LED lamp assembly. The LBLA functions in combination with a vehicle battery and a conventional vehicle flasher unit that includes a heater coil and a normally-open pair of contacts. When sufficient current is applied to the flasher unit, the heater coil produces a heat that causes the pair of contacts to close and allows a full 12-volts d-c to be applied to the input circuit of the LBLA.

When a vehicle operates with incandescent light bulbs, the bulbs draw a sufficient amount of current to allow the vehicle flasher unit, to function and provide the timed output voltage that causes the incandescent light bulbs to "blink". However, when using an output load circuit consisting of LED light bulbs there is insufficient current drawn by the LEDs to allow the vehicle flasher unit to function. The LBLA solves the low current problem by connecting an input circuit and an output circuit in parallel across the input of an LED load circuit. The input/output circuits have means for periodically producing a timed current flow that is applied through the flasher unit and that emulates the current flow produced by a conventional incandescent lamp(s). The timed emulated current allows the vehicle flasher unit to operate in a normal manner thereby causing the LEDs to blink. Additionally, when the LBLA is not connected to the vehicle flasher unit the LBLA consumes no energy.

In view of the above disclosure, the primary object of the invention is to provide an LBLA that can be internally integrated into an LED light bulb or be attached externally to various LED light assemblies. The LBLA allows an LED light bulb or an LED lamp assembly to operate a conventional vehicle flasher unit that causes the LED lights to "blink".

In addition to the primary object of the invention, it is also an object of the invention to produce a LBLA that:

allows vehicle incandescent light bulbs to be replaced by LED light bulbs without requiring any modification to the vehicle, can have the LBLA enclosed within a light bulb, can be utilized to replace various designs of single or dual-filament incandescent light bulbs, has a high reliability and a long useful life, produces a greater light output and uses less power than conventional incandescent lamps, draws no current when the LBLA is not connected to a vehicle flasher unit, is cost effective from both a consumer's or a manufacturer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
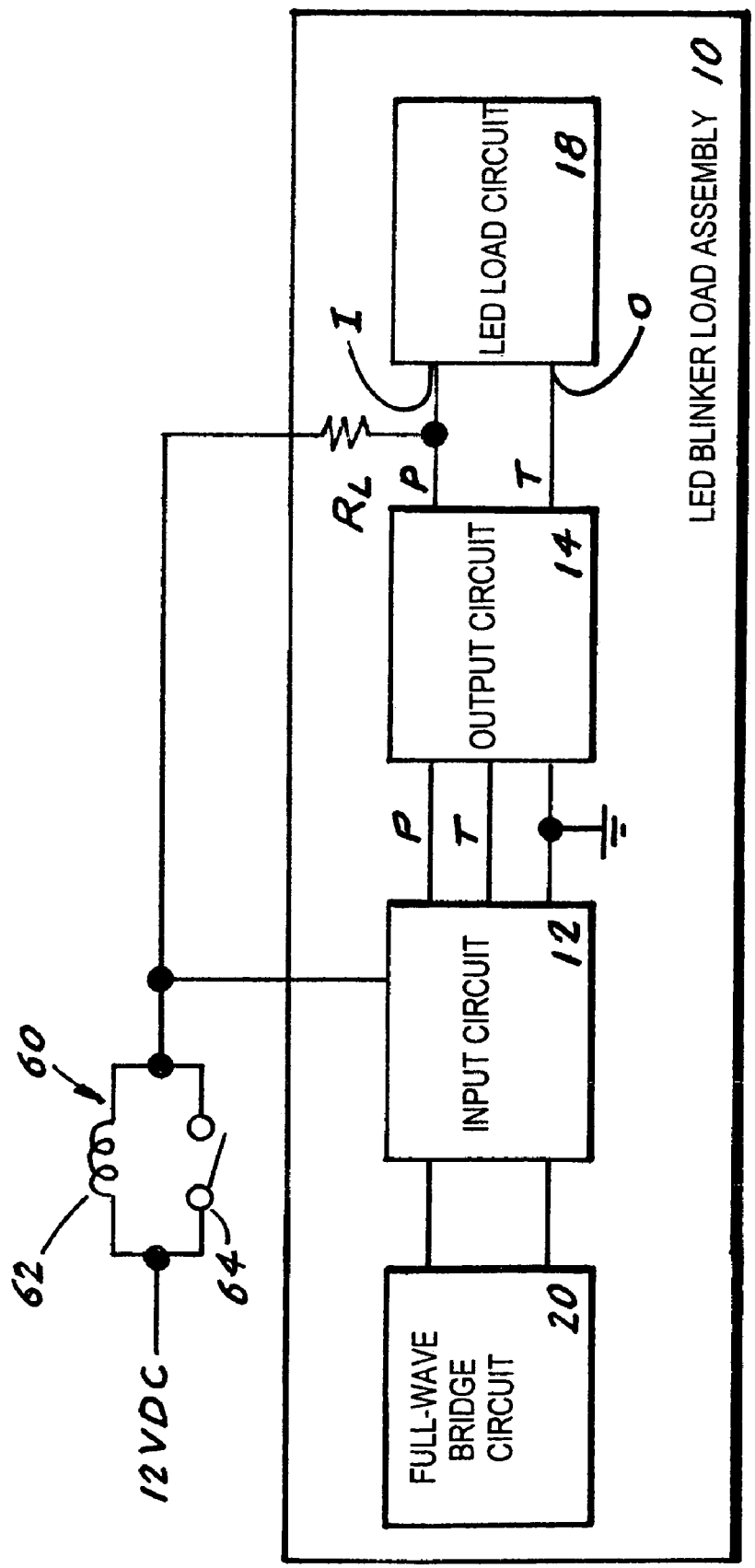
FIG. 1 is a block diagram of a basic LED blinker load assembly (LBLA) design.
Figure 2A:
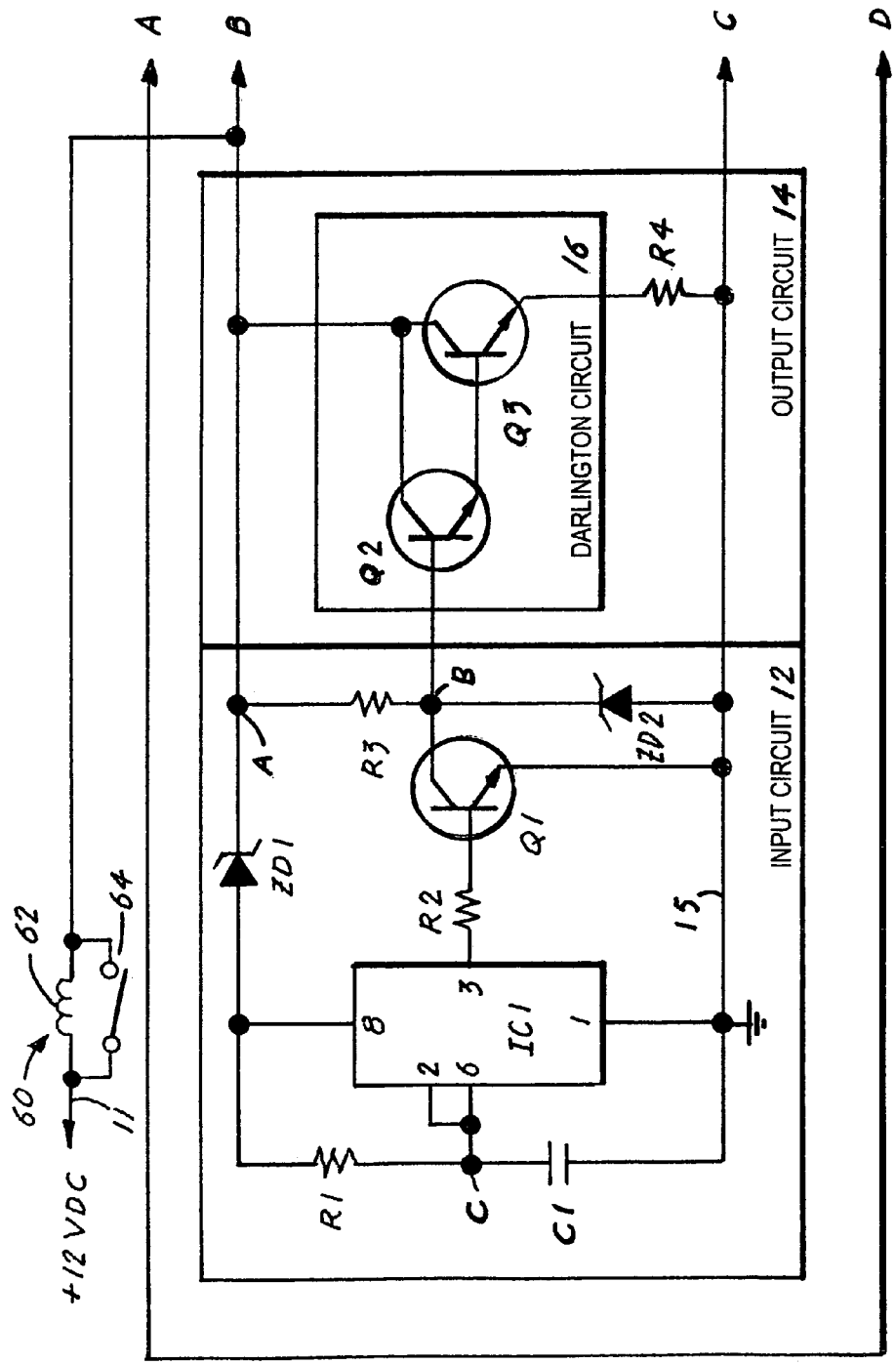
FIGS. 2A-2B are schematic diagrams of the preferred LBLA design.
Figure 5:
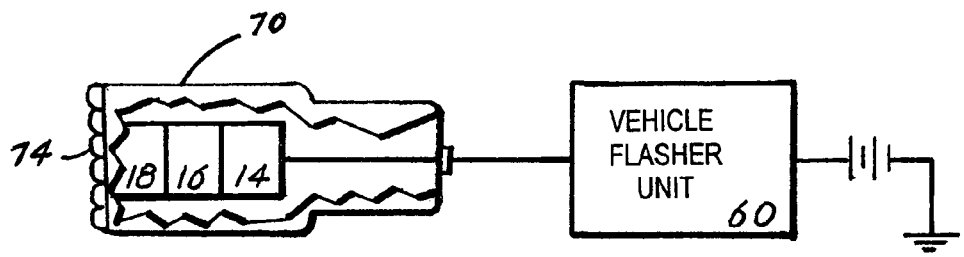
FIG. 5 is an elevational, cut-away view of a light bulb having a set of LEDs that protrude from the front of the light bulb.
Figure 6:
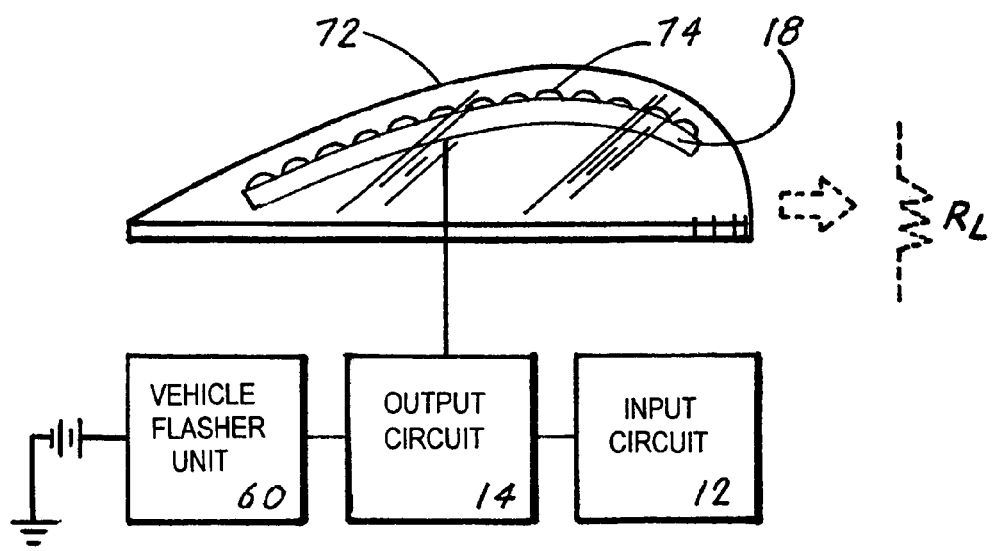
FIG. 6 is an elevational view of an LED lamp assembly that has externally attached an LBLA, less the LED load circuit.

The best mode for carrying out the invention is presented in terms of a preferred embodiment for an LED blinker load assembly 10 (LBLA 10). The preferred embodiment, as shown in FIGS. 1-6, is further disclosed in terms of a basic design, a preferred design and a third design. All three designs produce a timed current flow that emulates the current flow produced by incandescent lamps. The emulated timed current allows a conventional vehicle flasher unit 60 to operate in a normal manner. The vehicle flasher unit 60, as shown in FIGS. 1, 2A and 6, is comprised of a heater coil 62 and a normally-open pair of contacts 64 that are connected in parallel across the heater coil 62. The vehicle flasher unit 60 is operated by a turn signal arm or a hazard signal switch that are located within a vehicle and that are activated by the vehicle driver. The input to the flasher unit 60 is 12-volts d-c that originates from the vehicle battery and that is applied to the vehicle flasher unit 60 only when the turn signal arm is activated or the hazard signal switch is depressed. The output of the flasher unit 60 is initially applied through the coil 62 of the vehicle flasher unit 60, at which time the voltage applied to the LBLA 10 is less than 12-volts d-c. When the heat from the heater coil 62 causes the contacts 64 of the unit 60 to close, the full 12-volts d-c is applied through the contacts 64 to the LBLA 10.

The basic circuit, as shown in FIG. 1, is comprised of an input circuit 12, an output circuit 14 and an LED load circuit 18.

The LED load circuit 18 is comprised of a plurality of LEDs 74 that can consist of from one to sixty-four LEDs. The LEDs are preferably ultrabright LEDs, that are connected in a series/parallel combination. The LEDs have an input I that is applied through a current and voltage limiting means such as a resistor $R_L$, and an output O that is connected to circuit ground. The current and voltage limiter is necessary because the LEDs, each of which operates at a voltage of approximately 1.2 volts d-c would burn-out if the 12-volts d-c from the vehicle flasher unit 60 were to be applied.

The input circuit 12 is comprised of a timer/drive circuit that can consist of either a discrete transistor driver, an IC timer or a power-on one-shot circuit. The timer/driver circuit has means for receiving the output voltage from the vehicle flasher unit 60 and means for producing a timed drive signal T and a power signal P, both of which are applied to the output circuit 14.

The timed driver signal must:
 a) have a sufficient drive capability to operate the output circuit 14,
 b) be limited in the time the signal is applied to prevent the output circuit 14 from overheating, and
 c) be active for a length of time that allows the heater coil 62 to heat and cause the contacts 64 to close.

The output circuit 14 has means for receiving the timed drive signal T and the power signal P which are applied from the input circuit 12. The circuit 14 consists of a switching device, which, is in the form of a "shunt load" that is applied across the input I and the output O, which is connected to circuit ground. The switching device in essence a controlled short circuit that is designed to draw additional current from "power" to "ground" through the heater coil 62 thereby causing the vehicle flasher unit 60 to interpret the current as being applied from an incandescent lamp. When a sufficient timed current is applied to the coil 62, the coil will heat, causing the contacts 64 to close and allowing the full 12-volts d-c to be applied to the LED load circuit 18 via the resistor $R_L$. The switching device can consist of either a switching transistor, an IC switch, a relay that is connected in series with a current limiting device or a Darlington circuit.

As also shown in FIG. 1, an optimal full-wave bridge circuit 20 can be connected across the input circuit 12. The circuit 20, which can be utilized in all of the LBLA 10 designs, maintains a correctly polarized voltage at the input of the LBLA 10 to operate the plurality of LEDs 74.

Figure 2B:
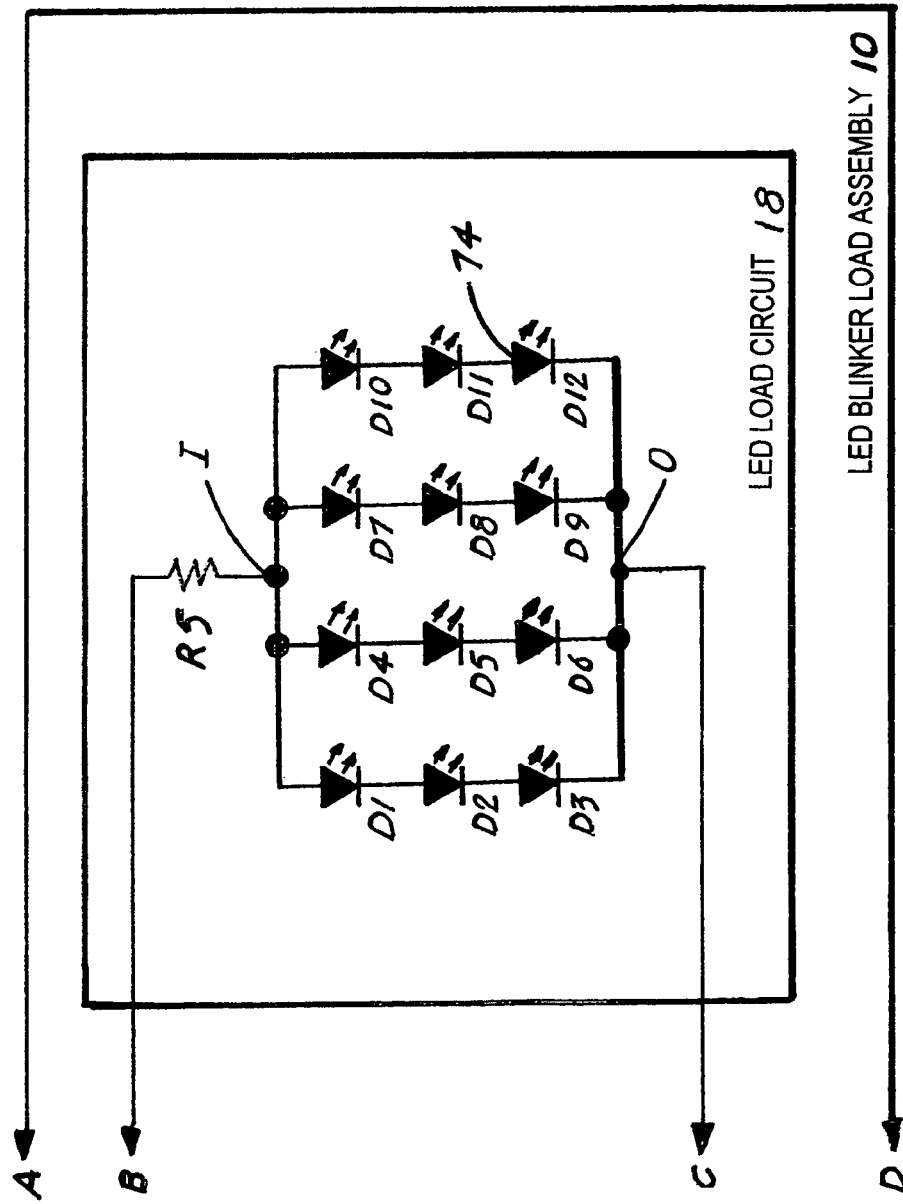

The preferred design of the LBLA 10, as shown in FIGS. 2A and 2B, is comprised of an input circuit 12, an output circuit 14 and an LED load circuit 18. The circuits 12 and 14 can be produced by utilizing discrete components. Preferably however, the two circuits can be integrated into an Application Specific Integrated Circuit (ASIC).

The input circuit 12 is comprised of a set of resistors R1, R2 and R3, a capacitor C1, a pair of zener diodes ZD1 and ZD2, an NPN transistor Q1, and a timing integrated circuit IC1 such as an NTE 7099 that includes pins 1, 2, 3, 6 and 8, wherein pin 1 is connected to a lead line 15 that is connected to circuit ground.

The output circuit 14 is comprised of a Darlington circuit 16 consisting of NPN transistor Q2, NPN transistor Q3 and resistor R4.

When the vehicle turn signal arm is placed in either a right-turn or a left-turn position, 12-volts d-c is applied through a lead line 11 to the input of the vehicle flasher unit 60, as shown in FIG. 2A. The output of the vehicle flasher unit 60 is a variable voltage that is applied to a junction A, which is located between the first end of resistor R3 and the cathode of the zener diode ZD1. From the junction A, the 12-volts d-c is applied through the collectors and the emitters of the Darlington circuit 16, through the resistor R4 to the lead line 15 which is connected to circuit ground. The 12-volts d-c, as shown in FIG. 2B, is also applied through the current limiting resistor R5 to the input I of a plurality of LEDs 74, which typically can range from one LED to sixty-four LEDs. As an example, in FIG. 2B, twelve LEDs (D1-D12) are shown.

At this time, in the ON and OFF cycle provided by the LBLA 10, there is insufficient current being drawn to activate the vehicle flasher unit 60, to illuminate the plurality of LEDs 74, or to activate the timing integrated circuit IC1. This low current is due to the fact that the resistance of the flasher unit's heater coil 62 is typically 50-ohms, which causes a voltage drop of less than 12-volts d-c to be applied to the junction A. The voltage at the junction A increases when the pair of contacts 64 on the flasher unit 60 close, which then allows the full 12-volts d-c to be applied to the junction A.

With the timing integrated circuit IC1 inactive, the transistor Q1 is also turned off because there is no signal applied from pin 3 of the IC1. With Q1 off, the collector of Q1 is also off. The collector of Q1 is connected to junction B that is located between the second end of the resistor R3 and the cathode of the zener diode ZD2, as shown in FIG. 2A.

The voltage at the junction A is applied through the resistor R3 to the base of the transistor Q2. The zener diode ZD2, which is connected across the junction B and circuit ground, functions to clamp the base voltage applied to the transistor Q2 to keep it from exceeding the maximum base/emitter voltage of the Darlington circuit 16. If this voltage is exceeded, the Darlington circuit 16 could be damaged, thereby causing the LBLA 10 to become disabled. The Darlington circuit 16 at this point is "on", and power flows from the junction A through the collectors of the Darlington circuit 16 through the resistor R4 to circuit ground. This condition causes additional current to be drawn through the heater coil 62 of the flasher unit 60, which in turn causes the coil 62 to heat thereby causing the normally-open contacts 64 to close. With the contacts 64 closed, the full 12-volts d-c is applied to the junction A, from where the voltage is applied through the resistor R5 to the LED load circuit 18, thereby causing the plurality of LEDs 74 to illuminate.

With 12-volts d-c being applied to the LBLA 10, the zener diode ZD1 has sufficient voltage to conduct. This conduction causes IC1 to become active and start its ON-OFF timing cycle. At this time, pin 3 of IC1 goes "high", applying a voltage to the base of the transistor Q1 through the current limiting resistor R2, thereby causing the transistor Q1 to turn "on", which causes the collector of Q1 to be pulled to circuit ground. The voltage at the junction B now goes "low", causing the Darlington circuit 16 to turn "off". The LBLA 10 now ceases to draw additional current to emulate a filament lamp.

At this point, the contacts 64 of the flasher unit 60 are closed, which allows the heater coil 62 to cool thereby causing the contacts 64 of the flasher unit 60 to open and repeat the timing cycle. Thus, causing the plurality of the LEDs 74 in the load circuit 18 to turn "off" and "on" as the cycle repeats.

The LED load circuit 18 is not "on" at all times. It only needs to be "on" long enough to cause the vehicle flasher unit 60 to activate. The "on" time should be set for as short period as possible so as not to cause the Darlington circuit 16 to overheat. As long as the Darlington circuit 16 is "on" for only short duration of time, no heatsink is needed. The "on" time is accomplished by the timing of the integrated circuit IC1, which acts as a monostable "Power on One Shot". The active "on" time is set by the time constant circuit consisting of the resistor R1 and the capacitor C1, which form a junction C from where a start timing signal 17 is applied to pin 2 of the integrated circuit IC1.

Figure 3:
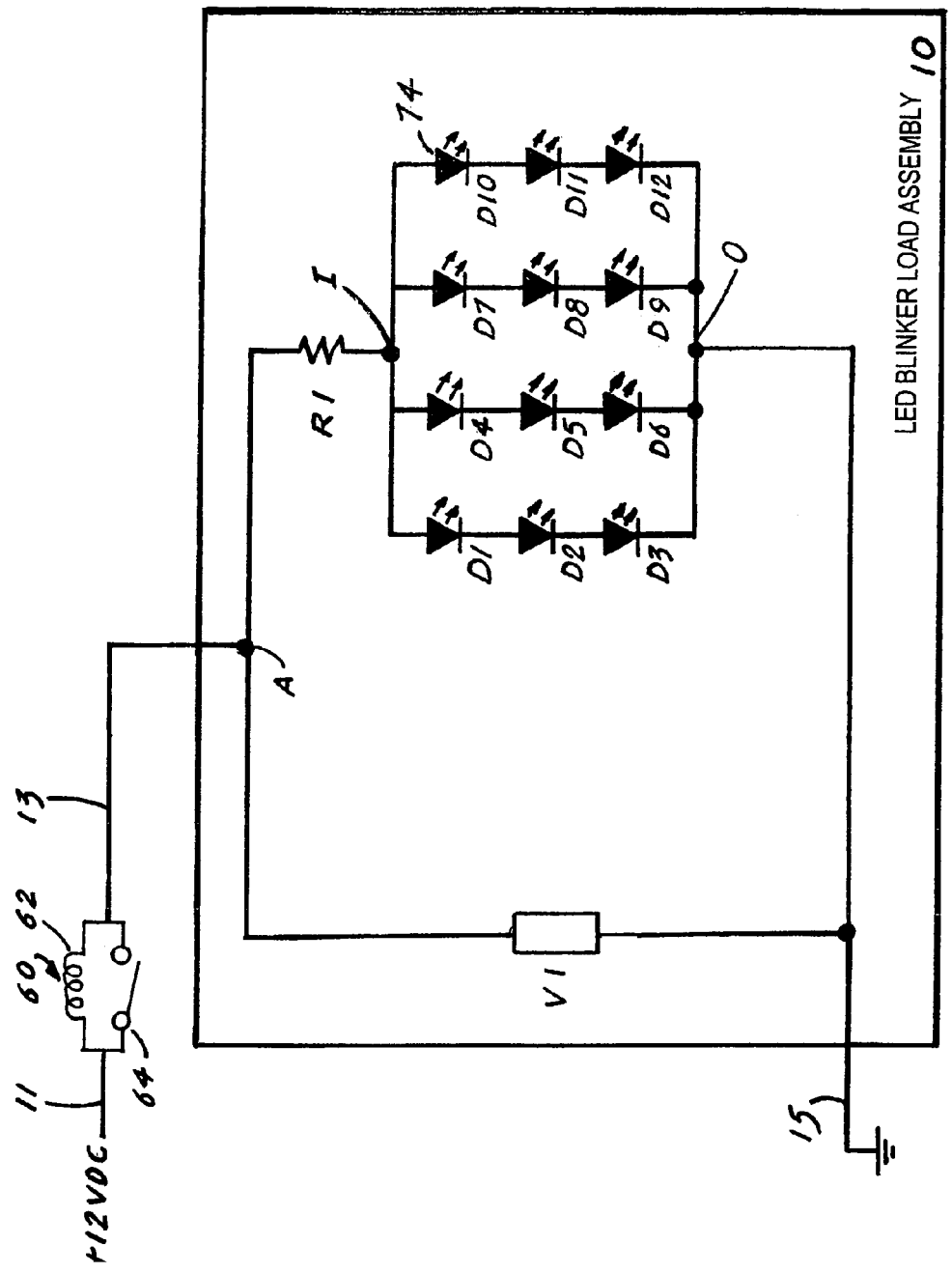
FIG. 3 is a schematic diagram of a third LBLA design.

The third design of the LBLA 10, as shown in FIG. 3, functions in a similar manner as described above for the basic and preferred design configuration. That is, it emulates the current drawn by an incandescent light bulb(s) to allow a conventional flasher unit 60 to operate in a normal manner.

The third design, as shown in FIG. 3, is operated by an electronics circuit that is comprised of a first lead line 11, a second lead line 13, a third lead line 15, a varistor V1 having a first end and a second end, a plurality of LEDs D1-D12, and a current limiting resistor R1.

The first lead line 11 is connected to a source of 12-volts d-c that originates from the vehicle battery. The 12-volts d-c is applied through the lead line 11 to the input of the vehicle flasher unit 60, which has an output that is applied through the lead line 13 to a junction A. From the junction A, the 12-volts d-c from the vehicle flasher unit 60 is applied to the first end of the varistor V1. The second end of the varistor V1 is connected to circuit ground via the lead line 15. Note: that power is applied to the LBLA 10 only when the vehicle turn signal arm is placed in either a right turn or left turn position. The varistor V1 is designed to cause additional current to be drawn across the lead lines 13 and 15 to allow the vehicle flasher unit to operate normally.

The plurality of LEDs 74, which typically range from one to sixty-four LEDs are connected in a series/parallel configuration and have an input end "I" and an output "O". The output end "O" is connected to the second end of the varistor V1. The input "I" is connected through the second end of the current limiting resistor R1. The first end of the resistor R1 is connected to the 12-volts d-c available at the junction A.

Figure 4:
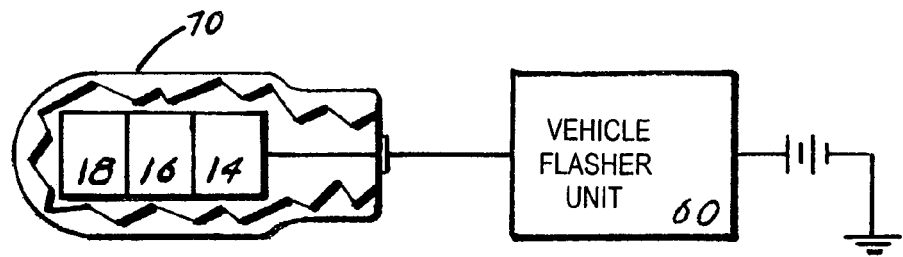
FIG. 4 is an elevation cut-away view of a LBLA that is totally integrated into the envelope of a light bulb.

The LBLA 10 can be physically designed to have all its circuits, namely the input circuit 12, the output circuit 14 and the LED load circuit 18, to be integrated into a light bulb 70, as shown in FIG. 4. Alternatively, the input circuit 12 and the output circuit 14 can be located within a light bulb with the LED load circuit protruding from the front surface of the light bulb 70, as shown in FIG. 5. The incandescent light bulbs that can be replaced by the inventive LED light bulbs include but are not limited to an 1156, 1157, 3056, 3057, 7440 and 7443.

The LBLA 10 can also be attached externally across the input leads of an LED front, rear or side lamp assembly 72, as shown in FIG. 6. When attaching the LBLA 10 to a lamp assembly 72, a load resistor $R_L$ that is typically attached across the input leads to the LEDs is removed prior to attaching the LBLA 10, as also shown in FIG. 6 in broken lines.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

The invention claimed is:

1. An LED blinker load assembly (LBLA) that allows a vehicle single or dual filament incandescent light bulb(s) to be directly replaced by a light bulb comprising a plurality of LEDs, wherein said LBLA functions in combination with a vehicle battery and a vehicle flasher unit (60) having a heater coil (62) that is connected in parallel with a normally-open pair of contacts (64), wherein the vehicle flasher unit (60) has an input that is connected to a source of 12-volts d-c and a variable output voltage that, when applied through the heater coil (62), is less than 12-volts d-c, and that when applied through the closed contacts (64), is 12-volts d-c, wherein said LBLA comprises:

a) an LED load circuit (18) comprising a plurality of LEDs that are connected in a series/parallel combination, said LED load circuit (18) having an input that is applied the output voltage from the vehicle flasher unit (60) through a current limiting resister ($R_L$), and an output that is connected to circuit ground, b) an input circuit (12) that is comprised of a timer/drive circuit having means for receiving the output voltage from the vehicle flasher unit, and means for producing a timed drive signal and a power signal which are applied to an output circuit (14), wherein the timed drive signal:
   (1) has a sufficient drive capability to operate said output circuit (14),
   (2) is limited in the time the timed drive signal is applied to prevent said output circuit (14) from overheating, and
   (3) is active for a length of time to allow the heater coil (62) to heat and cause the contacts (64) to close, and (c) said output circuit (14) having means for receiving the timed drive signal and the power signal from said input circuit (12), and for providing a shunt load that is applied across said LED load circuit (18), wherein said output circuit (14) is designed to draw additional current through the heater coil (62) to cause the contacts (64) to close and to apply the full 12-volts d-c that emulates the current drawn by the incandescent bulb, which causes the vehicle flasher unit to operate in a normal manner.

2. The assembly as specified in claim 1 wherein said plurality of LEDs (74) ranges from one LED to sixty-four LEDs.

3. The assembly as specified in claim 1 wherein said timer/driver in said input circuit is selected from the group consisting of a discrete transistor timer, an IC timer, and a power-on one-shot circuit.

4. The assembly as specified in claim 1 wherein said switching device in said output circuit is selected from the group consisting of a switching transistor, an IC switch, a relay connected in series with a current limiting device and a Darlington circuit.

5. The assembly as specified in claim 1 wherein said input circuit (12), said output circuit (14) and said LED load circuit (18) are internally integrated into the envelope of a light bulb.

6. The assembly as specified in claim 5 wherein said light bulb is selected from the group consisting of an 1156, an 1157, a 3056, a 3057, a 7440 and a 7443.

7. The assembly as specified in claim 1 wherein said input circuit (12) and said output circuit (14) are externally attached across the input leads of an LED front, rear or side lamp assembly.

8. The assembly as specified in claim 7 wherein prior to attaching said input circuit (12) and said output circuit (14) to an LED lamp assembly, a load resistor, which is typically attached across the input leads of the assemblies LEDs, is removed.

9. The assembly as specified in claim 1 further comprising at the input of said LBLA, a full-wave bridge circuit that maintains a correctly polarized voltage at the input of said LBLA.

10. An LED blinker load assembly (LBLA) that allows a vehicle single or dual filament incandescent light bulb(s) to be directly replaced by a light bulb comprising a plurality of LEDs, wherein said LBLA functions in combination with a vehicle battery and a vehicle flasher unit (60) having a heater coil (62) that is connected in parallel with a normally-open pair of contacts (64), wherein the vehicle flasher unit (60) has an input that is connected to a source of 12-volts d-c and a variable output voltage that, when applied through the heater coil (62), is less than 12-volts d-c, and that, when applied through the closed contacts (64), is 12-volts d-c, wherein said LBLA comprises:
   a) an input circuit (12) comprising:
      (1) an input that is applied the variable output voltage from the output of the flasher unit (60) through a lead line (13) to a junction A, which is formed between the first end of a resistor (R3) and the cathode of a zener diode ZD1,
      (2) a lead line (15) that is connected through a protection diode (D110) to circuit ground,
      (3) an integrated timing circuit (IC1) having a pins 1, 2, 3, 6 and 8, wherein pin 1 is connected to circuit ground,
      (4) a time constant circuit comprised of a resistor (R1) that intersects with a capacitor C1, wherein at their intersection a junction C is formed, from where a start timing signal (17) is applied to pins 2 and 6 of the integrated timing circuit IC1, wherein the first end of resistor (R1) is connected to pin 8 of the integrated timing circuit (IC1) and to the anode of zener diode ZD1, wherein the second end of capacitor (C1) is connected to circuit ground,
      (5) an NPN transistor Q1 having a base that is connected to pin 3 of the integrated circuit (IC1) via a current limiting resistor (R2), an emitter that is connected to circuit ground, and a collector that is connected to a junction B, which is formed between the intersection of the second end of resistor (R3) and the cathode of zener diode (ZD2), which has its anode connected to circuit ground,
   b) an output circuit (14) comprising a Darlington circuit (16) that is comprised of an NPN transistor (Q2) and an NPN transistor (Q3), wherein the collector of (Q2) is connected to the collector of (Q3), the emitter of (Q2) is connected to the base of (Q3), and the emitter of (Q3) is connected to circuit ground via a resistor (R4), wherein the voltage present at the junction A is applied to the collectors of transistors (Q2) and (Q3), and
   c) an LED load circuit (18) comprised of a plurality of LEDs (74) that are connected in a series/parallel configuration, wherein said LEDs (74) have an anode input (I) that is applied the voltage present at the junction A through a current limiting resistor (R5), and a cathode output (0) that is connected to circuit ground.

11. The assembly as specified in claim 10 wherein said input circuit (12), said output circuit (14) and said load circuit (18) are internally integrated into the envelope of a light bulb.

12. The assembly as specified in claim 11 wherein said light bulb is selected from the group consisting of an 1156, an 1157, a 3056, a 3057, a 7440 and a 7443.

13. The assembly as specified in claim 10 wherein said input circuit (12) and said output circuit (14) are externally attached across the input leads of an LED front, rear or side lamp assembly.

14. The assembly as specified in claim 13 wherein prior to attaching said input circuit (12) and said output circuit (14) to an LED lamp assembly, a load resistor ($R_L$), which is typically attached across the input leads of the assemblies LEDs, is removed.

15. The assembly as specified in claim 10 wherein said integrated timing circuit is comprised of an NTE 7099 integrated timing circuit.

16. The assembly as specified in claim 10 wherein said plurality of LEDs can range from one LED to sixty-four LEDs.

17. An LED blinker load assembly (LBLA) that allows a vehicle single or dual filament incandescent light bulb(s) to be directly replaced by a light bulb comprising a plurality of LEDs, wherein said LBLA functions in combination with a vehicle battery and a vehicle flasher unit (60) having a heater coil (62) that is connected in parallel with a normally-open pair of contacts (64), wherein the vehicle flasher unit (60) has an input that is connected to a source of 12-volts d-c and a variable output voltage that, when applied through the heater coil (62), is less than 12-volts d-c, and that when applied through the closed contacts (64), is 12-volts d-c, wherein said LBLA comprises:
   a) a first lead (11) that is connected to a source of 12-volts d-c that is applied to the input of the vehicle flasher unit (60), which has an output that is applied through a second lead line (13) to a junction A,
   b) a varistor (V1) having a first end connected to the junction A and a second end that is connected to circuit ground via a lead line (15), wherein the varistor (V1) causes additional current to be drawn across the leads (13,15) to cause the vehicle flasher unit (60) to operate normally,
   c) wherein said plurality of LEDs (74) are connected in a series/parallel configuration and have an input end (I) and an output end (0), wherein the output end (O) is connected to the second end of the varistor V1, and
   d) a current limiting resistor (R1) having a first end that is connected to the input end (I), and a second end that is connected to the junction A.

18. The assembly as specified in claim 17 wherein said varistor (V1), said plurality of LEDs and said resistor (R1) are internally integrated into the envelope of a light bulb.

* * * * *